United States Patent [19]
Eickman

[11] 3,790,105
[45] Feb. 5, 1974

[54] HYDRAULICALLY CONTROLLED FLUID STREAM DRIVEN VEHICLE

[76] Inventor: Karl Eickman, 2420 Isshiki Hayama-machi, Kanagawa, Japan

[22] Filed: Apr. 6, 1971

[21] Appl. No.: 131,782

Related U.S. Application Data

[63] Continuation of Ser. No. 782,349, Dec. 9, 1968, which is a continuation-in-part of Ser. Nos. 328,395, Dec. 5, 1963, and Ser. No. 551,023, May 18, 1966, abandoned.

[52] U.S. Cl. ................. 244/12 R, 60/51, 244/53 R
[51] Int. Cl. ............................................ B64c 29/00
[58] Field of Search ... 244/12 R, 12 B, 17.23, 53 R, 244/54, 60, 23 R; 60/51–53, 484, 421

[56] References Cited
UNITED STATES PATENTS

| | | | |
|---|---|---|---|
| 984,269 | 2/1911 | Friedel | 244/53 |
| 1,827,438 | 10/1931 | Rauch | 244/53 |
| 2,454,138 | 11/1948 | Delzer | 244/60 |
| 2,514,822 | 7/1950 | Wolfe, Jr. | 244/17.23 |

Primary Examiner—Duane A. Reger
Assistant Examiner—Jesus D. Sotelo
Attorney, Agent, or Firm—McGlew & Tuttle

[57] ABSTRACT

A hydraulic fluid driving arrangement for land, water or air vehicles includes rotary hydraulic motors driving respective propellers. The motors are arranged in pairs, with the two motors of each pair being on respective opposite sides of the longitudinal axis of the vehicle. One or more hydraulic pumps are driven by a prime mover and deliver hydraulic fluid under pressure to two or more separate outlets, with the flows in all outlets being either proportionate or equal to each other, and the outlets being completely separate from each other. One outlet supplies fluid to the motors on one side of the vehicle axis and the other supplies fluid to the motors on the other side of the vehicle axis. Respective flow adjustment means are operably associated with each outlet, and may be operated either independently or conjointly. Alternatively, control of the motor speeds may be provided by bypasses. Two or more outputs of the hydraulic pumps may be combined to supply two or more motor supply lines with equal or proportionate flows, with check valves being provided to prevent reverse flow. The two motors of each pair may be connected in series to receive the same fluid flow.

12 Claims, 24 Drawing Figures

INVENTOR.
KARL EICKMANN
ATTORNEYS

INVENTOR
KARL. EICKMANN

BY

ATTORNEYS

INVENTOR
KARL EICKMANN

ATTORNEYS

INVENTOR
KARL EICKMANN

BY

ATTORNEYS

INVENTOR
KARL EICKMANN

PATENTED FEB 5 1974 3,790,105

INVENTOR
KARL EICKMANN

BY

ATTORNEYS

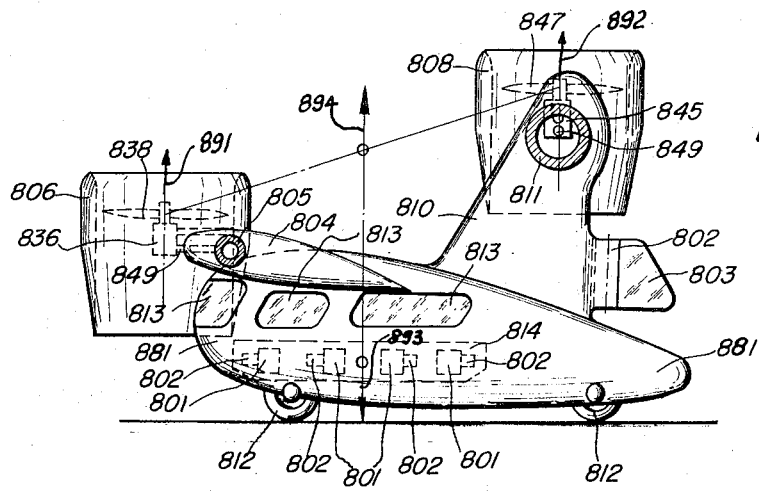
Fig. 16-A
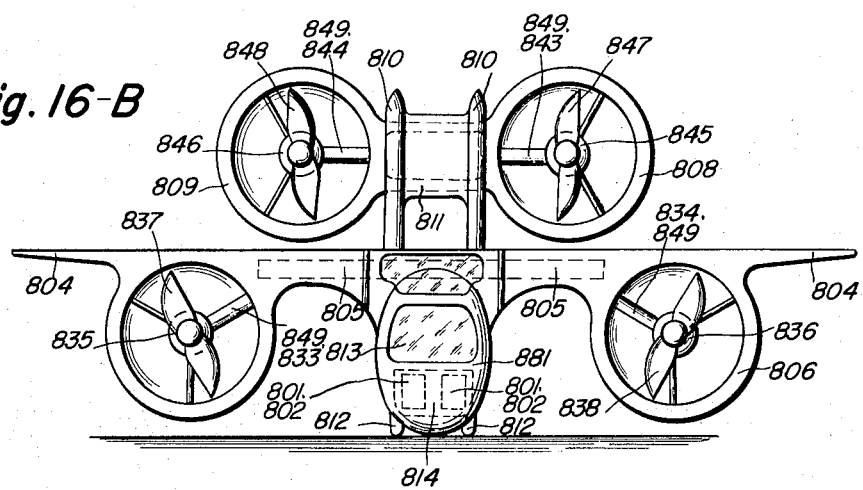
Fig. 16-B
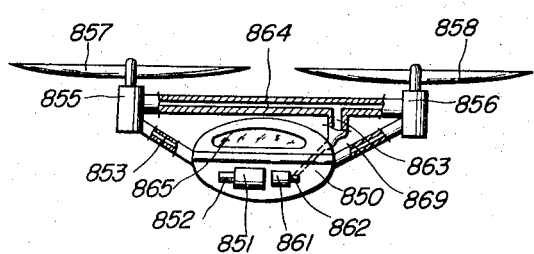
Fig. 17
INVENTOR
KARL EICKMANN

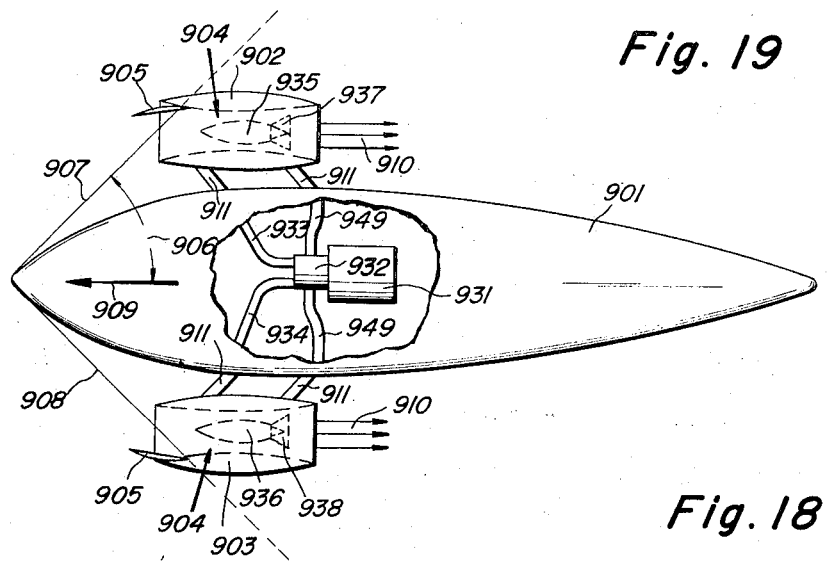
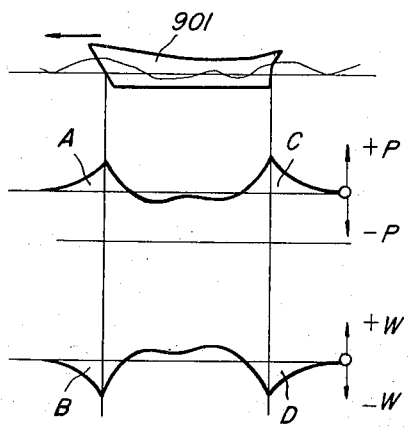
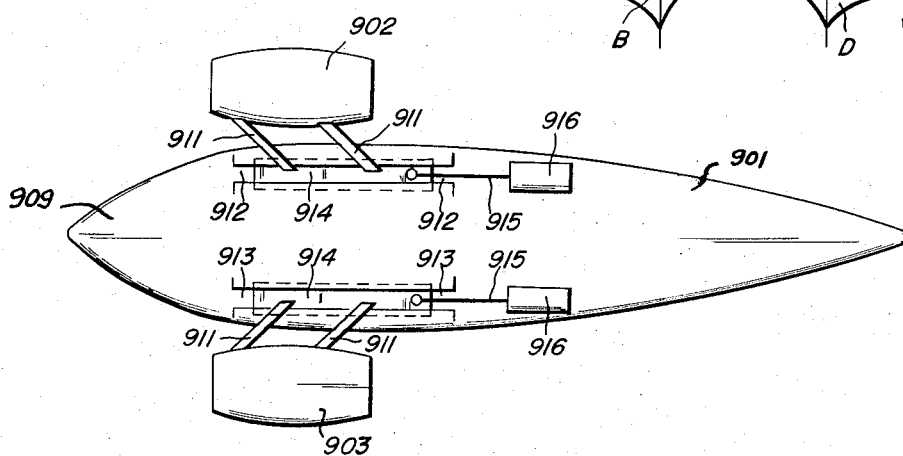

HYDRAULICALLY CONTROLLED FLUID STREAM DRIVEN VEHICLE

CROSS-REFERENCE TO RELATED APPLICATIONS

This application is a continuation of my copending patent application Ser. No. 782,349, filed Dec. 9, 1968, which is, in turn, a continuation-in-part of my copending patent applications Ser. No. 328,395, filed Dec. 5, 1963, and Ser. No. 551,023, filed May 18, 1966, and now abandoned.

SUMMARY OF THE INVENTION

This invention relates to fluid stream operated vehicles, such as vehicles supported or driven by rotating propellers, and, more particularly, to novel, simplified and improved hydraulic driving and control means for such vehicles.

In accordance with the invention, hydraulic fluid operated motors, driving propellers, are arranged in pairs, with the motors of each pair being arranged symmetrically on respective opposite sides of the longitudinal axis of the vehicle, and being of substantially equal rating. The motors are of a type known as positive displacement hydraulic fluid operated motors for revolving rotary members, such as propellers. Hydraulic fluid flow producing means, such as hydraulic fluid pumps driven by internal combustion engines or the like, are provided on the vehicle, and each fluid flow producing means has a pair of outputs whose fluid flows are substantially equal or proportionate to each other. One hydraulic fluid output of each fluid flow producing means is supplied to the positive displacement hydraulic motor or motors on one side of the vehicle longitudinal axis, and the other hydraulic fluid output of each fluid flow producing means is supplied to the propeller driving motors on the opposite side of the longitudinal axis of the vehicle.

Where more than one positive displacement hydraulic motor is provided on each side of the vehicle, the motors on each side may be supplied with hydraulic fluid in either a parallel connection or a series connection. In addition, bypass means may be provided between each hydraulic fluid supply line and the associated return line in order to adjust the relative rates of operation of the motors on opposite sides of the vehicle axis, in order to effect a turning movement or the like. Alternatively, means may be provided to supply an additional fluid flow to the motor or motors on one side of the vehicle axis in order to accelerate the same relative to the motor or motors on the other side of the vehicle axis, or vice versa.

The control and driving means of the invention is applicable to airborne vehicles, to waterborne vehicles, or to land vehicles such as wheeled vehicles or vehicles operating on runners or the like.

The outstanding feature of the invention hydraulic drive and control means is the stability of attitude of the vehicles to which the driving and control means are applied, as well as a great reduction in cost of the vehicles. The vehicles are simple, easy to control, and free of the usual disturbances attendant upon mechanical driving means.

An object of the invention is to provide inexpensive and simple hydraulic drive and control arrangements for fluid stream driven vehicles.

Another object of the invention is to provide such arrangements including positive displacement rotary fluid motors arranged in pairs and each driving a propeller or the like, with the motors of each pair being disposed at equal distances on opposite sides of the longitudinal axis of the vehicle, and with the motors of each pair being supplied, from a fluid flow producing means, with constantly proportional or equal fluid flows.

A further object of the invention is to provide such driving and control arrangements including means for controllably varying the rate of flow of working fluid to the motors on one side of the vehicle relative to those on the other sides of the vehicle to create a turning movement of the vehicle.

Another object of the invention is to provide such hydraulic driving and control arrangements including respective flow rate adjustment means for each of two or more outputs of a hydraulic fluid flow producing means, with the adjustment means being operable either individually or conjointly.

A further object of the invention is to provide such flow rate controlling means in the form of controllable bypasses between respective supply lines and the associated return lines.

Another object of the invention is to provide such a hydraulic driving and control arrangement in the form of a separate unit which may be secured to or mounted on a vehicle of any type.

A further object of the invention is to provide novel airborne, waterborne, or land vehicles incorporating the hydraulic driving and control arrangements of the invention.

Another object of the invention is to provide such a hydraylic control and driving arrangement in which the driven propellers, or other fluid flow creating means, operate in ducts or the like serving as lift creating means.

A further object of the invention is to provide such a hydraulic control and driving arrangement in which each positive displacement rotary fluid motor on one side of the vehicle axis is connected in series with the other motor of the pair on the opposite side of the vehicle axis.

For an understanding of the principles of the invention, reference is made to the following description of typical embodiments thereof as illustrated in the accompanying drawings.

BRIEF DESCRIPTION OF THE DRAWINGS

In the drawings:

FIG. 14b is a side elevation view corresponding to FIG. 14a;

FIG. 15b is a side elevation view, partly in section, corresponding to FIG. 15a;

FIG. 16A is a side elevation view of a VTOL aircraft, embodying the hydraulic control and driving means of the invention, as arranged for vertical take-off or landing;

FIG. 16B is a front elevation view of the aircraft shown in FIGS. 16A, but as arranged for horizontal movement;

FIG. 17 is an elevation view, partly in section, of another vehicle embodying the hydraulic control and driving means of the invention, and illustrating an intermediate fluid flow line interconnecting a pair of positive displacement rotary fluid motors;

FIG. 18 is a graphic illustration of the pressure and velocity conditions when a waterborne vehicle moves through water;

FIG. 19 is a top plan view of a waterborne vehicle embodying the hydraulic control and driving means of the invention, and having the pressure and velocity conditions illustrated in FIG. 18;

FIG. 20 is a top plan view of the vehicle shown in FIG. 19, illustrating longitudinal adjusting means for the driving means thereof.

DESCRIPTION OF THE PREFERRED EMBODIMENTS

Figure 1:
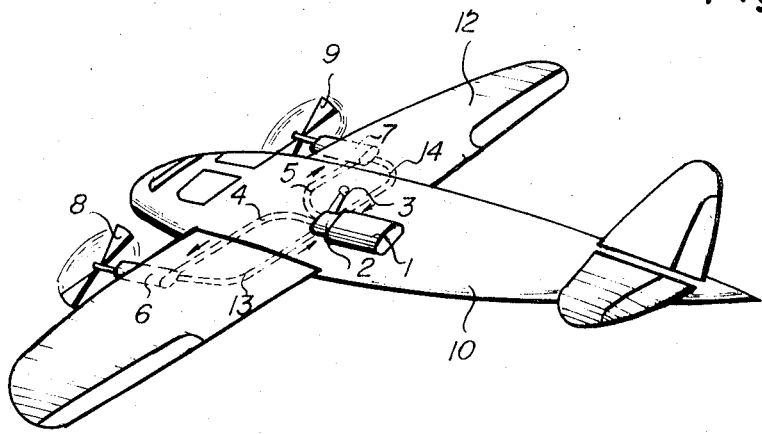
FIG. 1 is a perspective view of one embodiment of the invention illustrating a propeller driven aircraft incorporating the hydraulic control and driving means of the invention.

Referring to FIG. 1, the hydraulically controlled fluid stream driven aircraft illustrated therein, and which is especially easy to construct, easy to handle and very safe in operation, includes a body 10 having wings 11 and 12 assembled thereto in the usual manner. A power plant 1, in body 10 drives a fluid flow producing means 1 which may comprise, for example, a multi-flow, variable delivery, hydraulic pump, or any other kind of multi-flow producing means. The flow producing means 2 produces at least two flows and, in the illustrated embodiment, only two flows, which have equal flow rates. An adjustement means 3, for adjusting the delivery rate of flow producing means 2 is mounted thereon and is effective, when actuated, to vary the rate of flow in all the fluid flows produced by means 2, and in a definite proportionate manner from zero to the maximum delivery capacity, or to the maximum rate of flow, of flow producing means 2.

The two outputs of fluid flow producing means 2 are connected, by respective supply lines 4 and 5, to respective positive displacement rotary fluid motors 6 and 7 each driving a respective propeller 8 and 9, and respective return lines 13 and 14 return fluid to fluid flow producing means 2. The return may be made either directly or through a tank or reservoir connected to an inlet of the pump or fluid flow producing means 2.

The important feature of novelty of the embodiment of the invention shown in FIG. 1 is that the rate of flow of the two flows of fluid, in the respective lines 4 and 5, is proportionate at all times during operation of the vehicle, and there is no relative variation between the flows in the supply lines 4 and 5. The rate of flow in both supply lines is definitely and positively controlled by flow adjustment means 3 so that, if adjustment means 3 sets the flow rate to zero, the flow in both lines 4 and 5 will be zero and, if adjustment means 3 sets the rate of flow to a maximum, the flow rate in both lines 4 and 5 will be a maximum.

While a fluid flow producing means having a constant delivery, and no flow adjusting means, could be used, the angular velocity of propellers 8 and 9 could not be controlled by adjustment of the flow, but would have to be controlled by the angular velocity of flow producing means 2 or the speed of power plant 1. Consequently, it is preferable to use a fluid flow producing means having a flow adjustment means, as this permits the rate of operation of the motors 6 and 7 to be adjusted and set for the greatest economy before the aircraft starts. At such time, adjustment means 3 sets the delivery rate of flow producing means 2 to zero, so that the propellers 8 and 9 are at a standstill. Adjustment means 3 then can be gradually moved from the zero delivery position toward the maximum delivery position to accelerate gradually motors 6 and 7 and thus the respective propellers 8 and 9 to the desired rate of operation.

The rotary members or propellers 8 and 9 are arranged opposite sides of the longitudinal axis of the aircraft body 10, and at equal spacings from this axis. Preferably, propellers 8 and 9 are designed to have an equal size so that, for equal angular velocities thereof, the propelling fluid streams created by the propellers will be equal, and will produce equal thrusts, so that the stability of the aircraft in the air is maintained at all times. It is not necessary, in the embodiment of the invention shown in FIG. 1, to control motors 6 and 7 individually as hitherto customary. In addition, operation of the vehicle is simplified as it requires operation of only one control means, namely fluid flow adjusting means 3. It is thus possible to build aircraft, or other hydraulically controlled fluid stream driven vehicles, which are very simple in nature, safe in operation, and simply controlled, so that the work of the operator or pilot is greatly reduced so that he can apply more attention to the actual flight than is possible using conventional vehicles.

Figure 2:
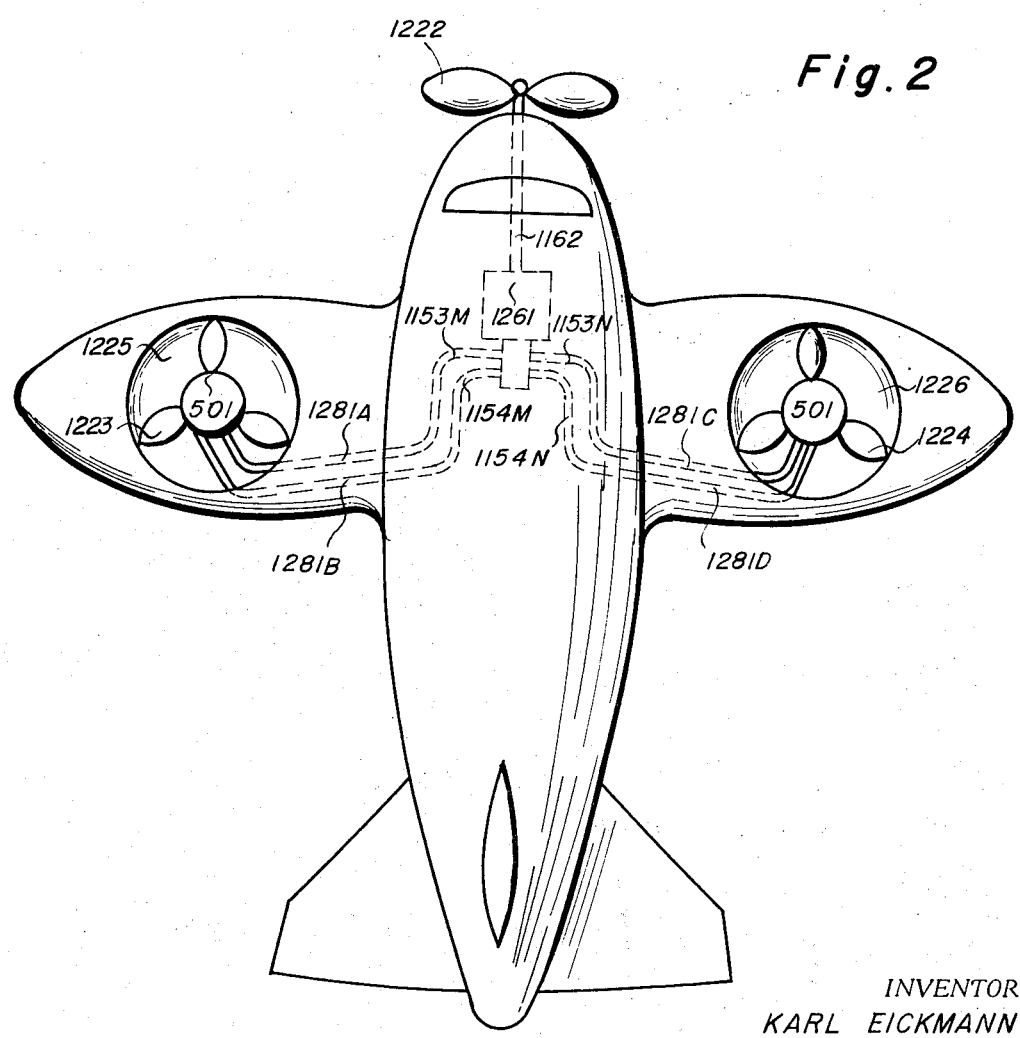
FIG. 2 is a top plan view illustrating another embodiment of the invention in the form of an aircraft having lifting propellers driven by the hydraulic control and driving means of the invention.

The aircraft shown in FIG. 2 is sustained vertically by propellers 1223 and 1224, located symmetrically on opposite sides of the longitudinal axis of the vehicle, and driven by positive displacement rotary fluid motors 501 supplied with hydraulic fluid, at proportionate or equal flow rates, from a fluid flow producing means or power plant 1261 having two outputs connected to motors 501 through respective supply lines 1281A and 1281C, so that motors 501 are driven at equal angular velocities. Fluid returns from motors 501 to fluid flow producing means 1261 through respective return lines 1281B and 1281D.

Movement of the aircraft in a forward direction is effected by a propeller 1222 driven by power plant 1261. The sustaining propellers 1223 and 1224 preferably are rotated in respective ducts 1225 and 1226, in order to increase the lifting capacity and to reduce resistance during horizontal flight of the aircraft. In the same manner as mentioned for FIG. 1, the aircraft shown in FIG. 2 is stabilized in the flight direction and in attitude due to the equal thrusts provided by propellers 1223 and 1224, in turn due to the equal angular velocities of motors 501 which are supplied with hydraulic fluid at flow rates which are equal or proportionate at all times.

Figure 3:
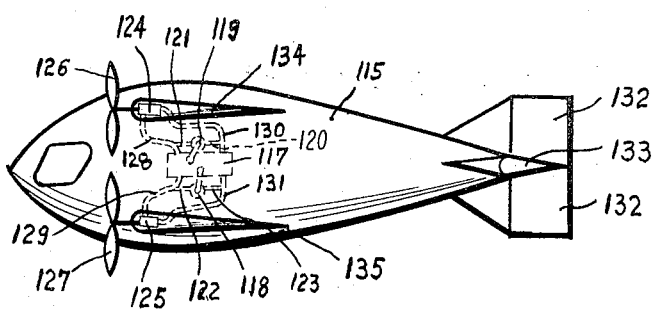
FIGS. 3 and 4 are side elevation view of a VTOL aircraft, representing another embodiment of the invention, and having its propellers driven by the hydraulic control and driving means of the invention, FIG. 3 illustrating the aircraft in horizontal orientation and FIG. 4 illustrating the aircraft in vertical orientation.
Figure 4:
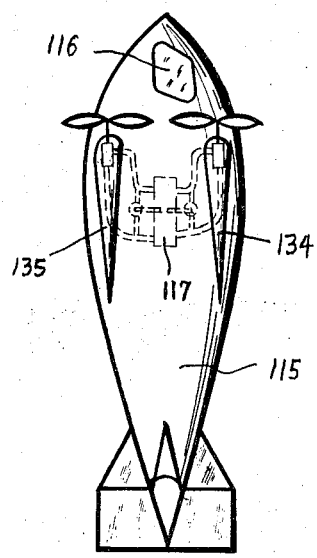

The hydraulically controlled and driven VTOL aircraft shown in FIGS. 3 and 4 comprises a body 115 having a cabin 116 and control surfaces 132 and 133. A fluid flow producing means 117, which may include a power plant, is mounted in body 115 and has a plurality of outputs delivering hydraulic fluid at equal or proportionate flow rates. The driving propellers are arranged in pairs, with the respective propellers of each pair being arranged on opposite sides of the vehicle longitudinal axis and at equal distances therefrom. Only the propellers 126 and 127, one one side of the vehicle, are illustrated in FIGS. 3 and 4. The vehicle is supported by the propellers 126 and 127 during vertical flight, and it may be supported by wings 134 and 135, arranged in pairs on opposite sides of body 115, during horizontal or inclined flight. Alternatively, it may be supported both by the propellers and by the wings during inclined flight. Respective supply lines 128 and 129 supply hydraulic working fluid to respective positive displacement motors 124 and 125 each rotating a respective propeller 126 and 127, with the fluid being returned to fluid flow producing means 117, either directly or indirectly, through respective return lines 130 and 131. As separate fluid flows are supplied to each of the two positive displacement motors, and as the separate flows have constantly proportionate or equal flow rates, propellers 126 and 127 are always rotated at equal angular velocities and thus create air streams having equal flow rates and thus equal thrusts.

The thrusts are effective to move the vehicle either vertically or horizontally, and are balanced so as to maintain a stable attitude of the vehicle due to the proportionality or equality of the two fluid flows.

A feature of the embodiment of the invention shown in FIGS. 3 and 4 is the provision of respective adjustable flow controlling means 118 and 119 in respective bypasses 122–123 and 120–121 interconnecting respective supply lines 129 and 128 to respective return lines 131 and 130. If these bypass means are closed, the proportionality of the fluid flow in supply lines 128 and 129 is maintained. In order to change the direction of movement, or the attitude, of the aircraft, such as a change from vertical attitude to horizontal attitude, or vice versa, a differential is established between the thrusts on opposite sides of the vehicle. Such differential is established by selectively opening, a selected amount, either one of the bypass means 118 or 119 to correspondingly reduce the rate of operation of one motor 124 or 125 relative to the other, which causes a corresponding moment of the aircraft about its pitch axis.

Preferably, the cross-sectional areas of the bypasses are very small, so that only a very small proportion of the main flow can be bypassed. Flow through the bypasses is due to the pressure differential between the respective supply line and the respective return line. Turning of the vehicle, during horizontal flight, can be effected by providing driving arrangements on both sides of the vehicle also having associated therewith selectively operable bypass means similar to the bypass means 118 and 119. The turning movement about either axis can be controlled, accurately and to any desired extent, by selective operation of bypass means 118 and 119. With both bypass means completely closed, the vehicle will fly in a straight line along either a vertical, a horizontal, or an inclined flight path.

Figure 5:
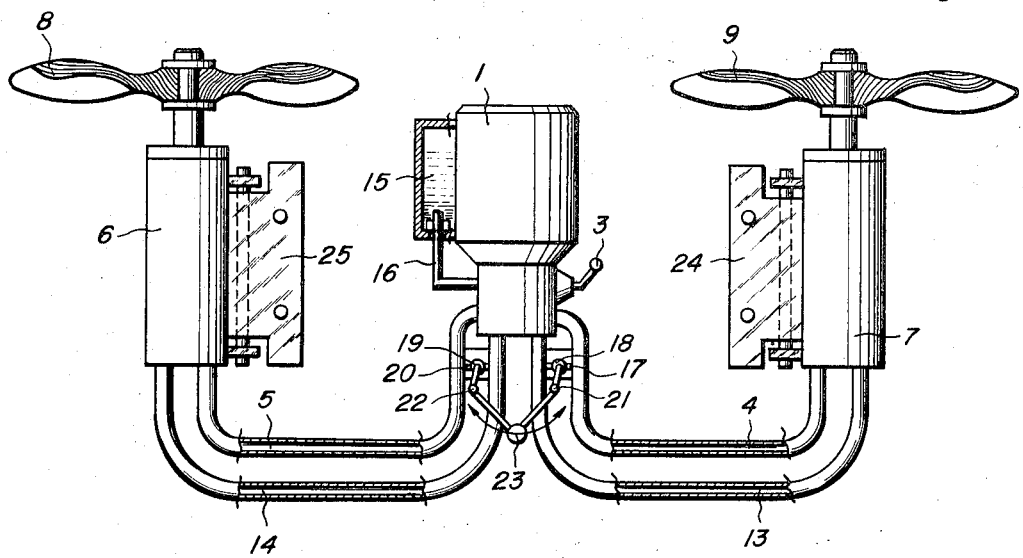
FIG. 5 is an elevation view, partly in section, of a hydraulic control and driving arrangement embodying the invention, and which can be mounted on any suitable type of vehicle.

The hydraulic driving and control arrangement illustrated in FIG. 5 is a unit which can be mounted on any type of vehicle. This unit includes a power plant driving fluid flow producing means 1 having outputs with proportional or equal delivery rates, connected to respective supply lines 4 and 5 which deliver working hydraulic fluid to respective positive displacement fluid motors 6 and 7 at proportionate or equal flow rates. Respective return lines 14 and 15 connect motors 6 and 7 to fluid flow producing means 1, which may withdraw fluid from tank or reservoir 15 through line 16 and which is preferably provided with a fluid flow adjusting means 3 effective to control the displacement value of the displacement chambers therein in proportion to each other. Control adjustment means 3 thus assures that, at all times, hydraulic working fluid is supplied to the motors 6 and 7, driving propellers 8 and 9, at equal or proportionate rates of flow and in supply lines which are separate from each other.

Respective bypass lines 17 and 19, each including a respective control means 18 and 20, interconnect respective supply lines 4 and 5 to respective return lines 13 and 14. By-pass lines 17 and 19 have a very small cross-sectional area, compared to those of supply lines 4 and 5, and thus allow bypassing a small proportion or fraction of the working fluid. Control means 18 and 20 may be operated separately or may be conjointly operated through connection means 21 and 22 connected to a combined operating means 23. By using means or handle 23, it is possible to change the relative angular velocities of propellers 8 and 9 by operating only a single control handle.

The unit shown in FIG. 5 is transportable and may be mounted on any kind of vehicle by the adapting means 24 and 25, with the mounting on the vehicle being effected in a manner such that motors 6 and 7 are located symmetrically on opposite sides of the vehicle longitudinal axis. By virtue of a pivoting arrangement provided between each adapting member and the associated motor, the motors 6 and 7 can be swung into or out of the vehicle.

Figure 6:
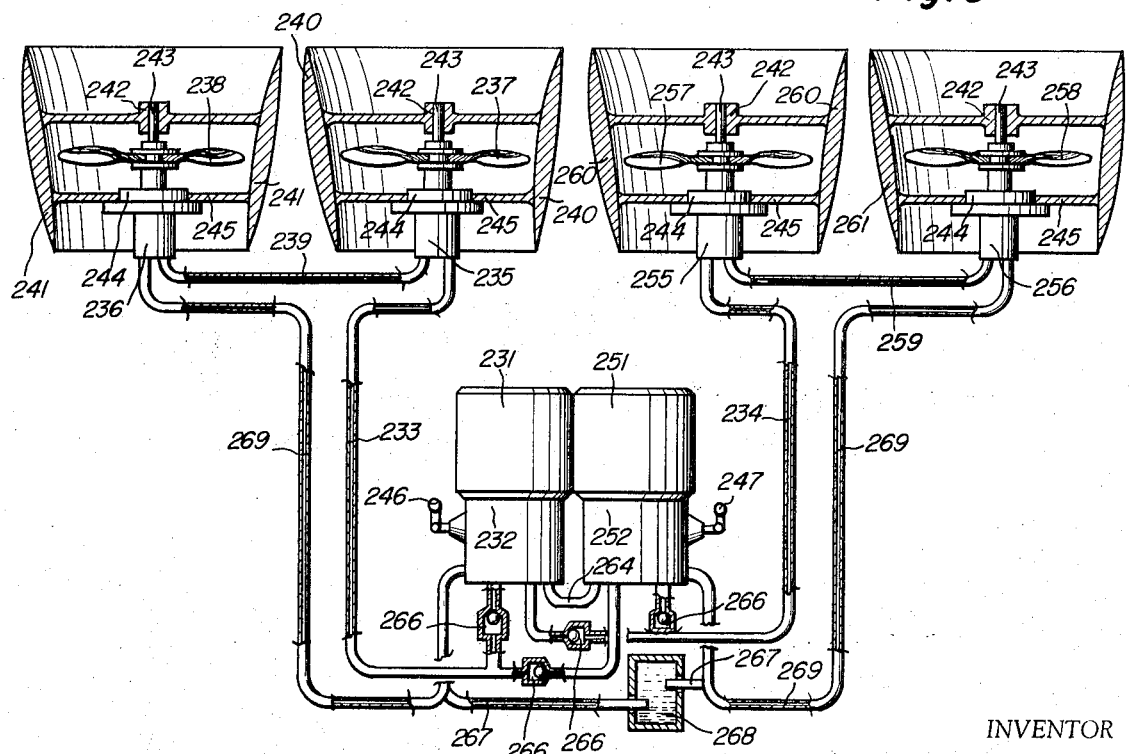
FIG. 6 is a view, similar to FIG. 5, of another embodiment of the hydraulic control and driving means of the invention, and which also can be mounted on any suitable type of vehicle.

In the self-contained unit shown in FIG. 6, two fluid flow producing means 232 and 252, driven by respective power plants 231 and 251, supply two pairs of positive displacement rotary fluid motors 235, 236 and 255, 256, each driving a respective propeller 237, 238 and 257, 258. Each fluid flow producing means has two separate outputs having proportionate or equal rates of flow of working fluid. The inlets of fluid flow producing means 232 and 252 may be connected either separately or conjointly to a tank or reservoir 268.

A supply line 233 extends from one output of fluid flow producing means 232 to an inlet of fluid motor 235, and the outlet of fluid motor 235 is connected to the inlet of fluid motor 236 by a line 239. The outlet of motor 236 is connected by a return line 269 either to a fluid flow producing means or to tank 268. Thus, motors 235 and 236 receive the same flow of working fluid and are connected in series with each other. The other outlet of fluid flow producing means 232 is connected by a supply line 234 to the inlet or rotary fluid motor 255, and a line 259 connects the outlet of rotary fluid motor 255 to the inlet of rotary fluid motor 256. A return line 269 connects the outlet of motor 256 to either a fluid flow producing means or to tank 268. Thus, motors 255 and 256 are connected in series with each other and receive the same flow of fluid therethrough.

Each pair of series connected motors thus receives a separate fluid flow, and the two fluid flows have proportionate or equal flow rates. Due to the equal or proportionate angular velocities of the four fluid motors, the respective propellers are driven at equal or proportionate angular velocity to provide fluid streams of substantially equal thrusts.

It will be noted that one output of fluid flow producing means 232 is connected to supply line 233 by a checkvalve means 266, and correspondingly one output of fluid flow means 252 is connected to supply line 233 through a checkvalve means 266 whereby first outputs of both fluid flow producing means are combined into a single first flow of working fluid in supply line 233. The second output of fluid flow producing means 232 is connected through a checkvalve means 266 to supply line 234, to which the second output of fluid flow producing means 252 is also connected through a checkvalve means 266, the two second outputs thus being combined into a single flow through supply line 234.

Thus, if either one of the fluid flow producing means 232, 252, or either one of the respective power plants 231, 251, fails, the other fluid flow producing means would still deliver two outputs, one to supply line 233 and the other to supply line 234. The checkvalve means prevent backflow of fluid in the event of failure of one or the other of either the fluid flow producing means or the associated power means.

Return lines 269 return the working fluid directly or indirectly into tank 268, although a cooling means may be interposed in advance of this tank. The return lines may be connected to the common intermediate line 264, which could also be a drain line. Lines 267 represent suction lines leading from tank 68 to the fluid flow producing means 232 and 252.

Additionally, each fluid flow producing means preferably is provided with a respective fluid flow adjusting means 246, 247 operable to change the effective displacement of the pumping chambers in the fluid flow producing means, between a minimum and a maximum value, and vice versa, and, during operation of the fluid flow producing means, to adjust proportionately the two outputs of each fluid flow producing means. These adjusting means may be individually operated or they may be operated by a combined operating member.

A feature of the embodiment of the invention shown in FIG. 6 is that the propellers are mounted in respective ducts 240, 241 and 260, 261 having axial cross-sections such that the ducts can act somewhat in the nature of lift devices, which greatly increases the thrusts due to the rotating propellers. The several motors are mounted in the ducts by virtue of respective flange means 244 secured to respective support members 245, and the output shaft of each motor, connected to the associated propeller, is supported in a respective bearing means 243 of a support 242 extending transversely of the associated ducts. This enclosing of the propellers and their driving motors in the ducts has an advantage from the safety standpoint in that the propellers are protected from contact with persons or animals. In the same manner as in the embodiment of FIG. 5, the unit of FIG. 6 may be mounted on any type vehicle.

Figure 7:
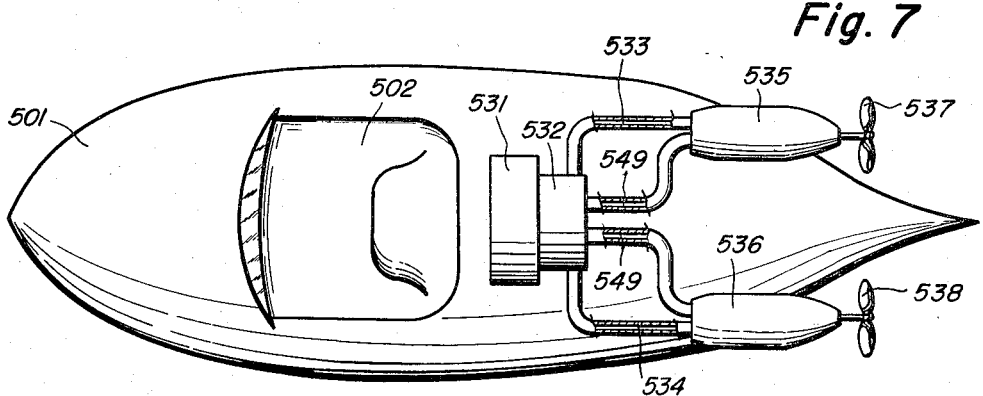
FIGS. 7 and 8 are top plan views of waterborne vehicles embodying the hydraulic control and driving means of the invention.

The waterborne vehicle shown in FIG. 7 has a body 501 which may have a freight or passenger compartment 502, and which mounts a power plant 531 driving a fluid flow producing means 532 having two outputs of equal or proportionate fluid flow rates. Means 532 may be either a constant or a variable delivery means but, in either event, produces two separated flows of equal or proportionate flow rates or velocities. The velocity of the two fluid flows may be controlled by variation in the speed of means 531, or fluid flow producing means 532 may be provided with fluid flow adjusting means in the manner already described for other embodiments. Supply lines 533 and 534 connect the respective outputs of means 532 to respective positive displacement rotary fluid motors 535 and 536 driving respective propellers 537 and 538. The fluid is returned from the motors by return lines 549. As in the previous embodiments, the two motors 535, 536 and their associated propellers are mounted symmetrically on opposite sides of the longitudinal axis of the vehicle and at equal distances from this axis.

Equal thrusts are provided by both propellers 537 and 538. It is preferred that the rate of fluid flow in the separated outputs be not only proportionate but also equal, and that the fluid motors and their associated propellers be equal in size. Thereby, it is assured that body 501 always moves either stright forward or straight backward or, in the event that it is an airborne vehicle, either straight upwardly or straight downwardly.

Figure 8:
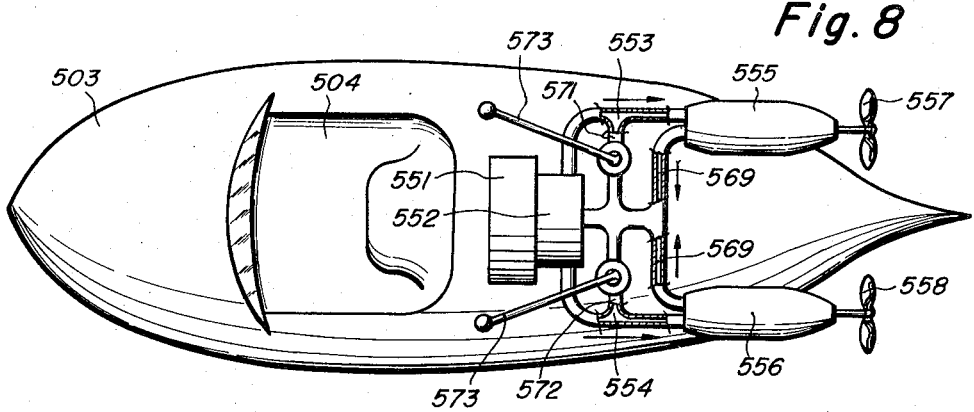

The vehicle shown in FIG. 8 is essentially similar to that shown in FIG. 7, and has a body 503, a cabin 504, a power means 551 and a fluid flow producing means 552 providing two outputs of equal or proportionate rates of flow of working fluid. The embodiment of FIG. 8 differs from that of FIG. 7 by the provision of bypass means between each supply line and its associated return line. As in FIG. 7, respective supply lines 553 and 554 connect the respective two outputs of means 552 to respective positive displacement rotary fluid motors 555, 556 driving respective propellers 557, 558, with the return flow taking place through respective return lines 569.

Bypass passages 571 and 572 connect the respective supply lines 553 and 554 to the common return line. Each bypass passage is provided with a respective adjustable bypass means 573. Preferably, bypass lines 571, 572 have a large cross-sectional area so that, when either control means 573 is fully opened, the vehicle can make a relatively sharp turn due to the corresponding relatively great reduction in speed of the associated rotary fluid motor and its connected propeller. However, if it is preferred that the vehicle be able to execute only relatively gentle turns, the cross-sectional flow areas of the bypass lines can be made very small so that only a slight relative change in speed of motors 555 and 556 is effected in response to full opening of a selected bypass control means 573.

As an alternative to the bypass means 573, multi-way controllers can be provided between the delivery and return lines, so that the respective fluid flows may be selectively reversed, if desired. Such reverse movement also could be obtained by reversing the direction of rotation of the fluid flow producing means 552.

Figure 9:
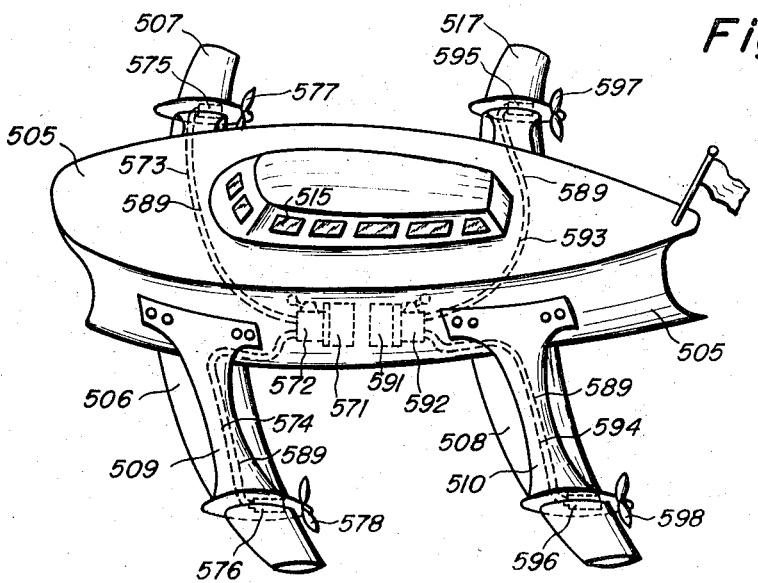
FIG. 9 is a perspective view of a waterborne hydrofoil vehicle embodying the hydraulic control and driving means of the invention.

The waterborne vehicle illustrated in FIG. 9 includes hydrofoils or wings 506, 507, 508 and 517 arranged in pairs with the wings of each pair on opposite sides of body 505 which may include a passenger or freight compartment 515. Body 505 carries drive means 571 and 591 driving respective fluid flow producing means 572 and 592, each drive means and its associated fluid flow producing means preferably being mounted as low as possible on body 509 to insist in maintaining stability of the vehicle. Each fluid flow producing means provides two separated outputs of equal or proportionate working fluid flow velocity, with the two flows being completely separate from each other. The hydrofoils are braced from body 505 by suitable supporting struts 509 and 510.

The respective outputs of fluid flow producing means 572 are connected, through respective supply lines 573 and 574 to respective positive displacement rotary fluid motors 575 and 576 driving respective propellers 577 and 578, the fluid flow being returned through respective return lines 589. Similarly, the respective outputs of means 592 are connected by respective supply lines 593 and 594 to respective positive displacement rotary fluid motors 595 and 596 driving respective propellers 597 and 598, with the working fluid being returned through respective return lines 589. The motors are mounted on respective hydrofoils, and are arranged symmetrically with respect to the longitudinal center line of body 505. Additionally, the motors preferably are equal in size, as are also the respective propellers, so that the thrusts provided by the four motors are substantially equal to each other.

If both power plants and their fluid flow producing means are operating, equal flows of working fluid are delivered to all the motors for driving all the propellers at substantially equal angular velocities. The resultant thrusts are sufficiently strong, upon an increase in the angular velocities of the propellers, that body 505 is lifted out of the water and is supported substantially entirely by the wings or hydrofoils. The symmetrical motor arrangement provides for driving the vehicle stably in a forward direction, with the thrust forces being in equilibrium with the resistant forces acting on the hydrofoils. This assures stability of movement of the vehicle and easy control thereof and, at the same time, the vehicle is simple and relatively inexpensive to construct and the relatively small rotary fluid motors offer little resistance to vehicle movement.

While only one fluid flow producing means and its associated drive could be provided to operate either pair of rotary fluid motors, each mounted on a respective hydrofoil, the vehicle preferably is provided with two sets of motors each mounted on a respective hydrofoil. The fluid flow producing means can be either variable or constant flow means and, in the event that they are variable flow means, fluid flow adjusting means are provided for each producing means. Alternatively, the outputs can be varied by controlling the speed of the driving means 571 and 591.

Figure 10:
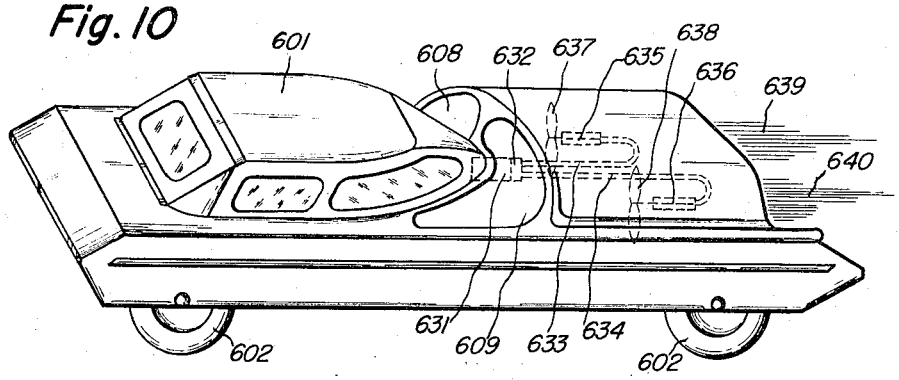
FIG. 10 is a perspective view of a wheeled land vehicle embodying the hydraulic control and driving means of the invention.

The land vehicle illustrated in FIG. 10 has a body 601 supported on wheels or rollers 602, and the body supports a power plant 631 driving a fluid flow producing means 632 having two or more entirely separated outputs providing working fluid flows of equal or proportionate velocity. The respective two outputs of fluid flow producing means 632 are connected, by respective supply lines 633 and 634 to respective positive displacement fluid flow motors 635 and 636, with the working fluid being returned through respective return lines. Motors 635 and 636 drive respective propellers 637 and 638, so that, with equal or proportional flows of working fluids to both motors, these propellers produce equal or proportionate air flows, and preferably air flows which are equal in flow rate. The propellers and associated motors are symmetrically arranged on opposite sides of the longitudinal center line of the vehicle, so that the vehicle is driven stably, either forwardly or backwardly, by the reaction forces from fluid streams 639 and 640. For protective purposes, propellers 637 and 638 are disposed in respective ducts 608 and 609.

The speed of the vehicle can be controlled by varying, in a proportionate or equal manner, the rate of delivery of working fluid to the two motors, and such variation can be effected either by a suitable flow adjustment device or by varying the speed of power plant 631. In the manner described for other embodiments, bypass means or additional fluid flow control means can be provided to effect a differential between the thrusts 639 and 640 to effect a selected turning movement of the vehicle.

Figure 11:
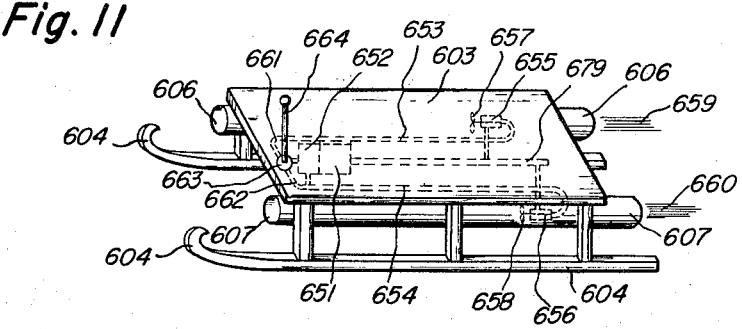
FIG. 11 is a perspective view of a sled embodying the hydraulic control and driving means of the invention.

FIG. 11 illustrates a fluid stream driven sled including a body 603 supported on runners 604 and having connected thereto ducts or tubes 606 and 607. Duct 605 contains one or more positive displacement rotary fluid motors 655, and duct 607 contains one or more positive displacement rotary fluid motors 656. Revolving members or propellers 657, 658, driven by respective fluid motors 655, 656, create fluid streams inside the respective ducts 606, 607, and these fluid streams are shown at 659 and 660. The working fluid for the motors is provided by a fluid flow producing means 652 driven by a power plant 651, and having two outputs providing proportionate or equal rates of flow of the working fluid. The outputs of means 652 are connected through respective delivery lines 653 and 654 to the respective motors 655 and 656, to drive these motors and the associated propellers, and the fluid is returned by return lines 679 directly or indirectly into the fluid flow producing means, so that the vehicle is driven by the reaction forces of air streams 659 and 660. The straightness and stability of movement of sled 603 is assured due to the equilibrium of the thrust forces and the resisting forces.

The ducts containing the rotary fluid motors are mounted symmetrically on opposite sides of the longitudinal center line of the vehicle and, as the relatively wide lateral spacing of the two fluid streams increases the stability of movement of the sled, very simple steering means can be provided in the form of a bypass control means 664 included in a bypass line 661. By operation of control means 664, it is possible to create a differential between the thrusts 659 and 650, resulting in steering of the sled in a selected direction.

Alternatively, instead of providing this bypass means, it is also possible to provide an additional fluid flow producing means for supplying additional working fluid to a selected one of the two supply lines in accordance with the desired direction of turning movement of the sled. This additional fluid flow could be directed by a control means 663 into either supply line 661 or 662. Such a control by supplying an additional fluid is also applicable to the other embodiments of this invention.

Figure 12:
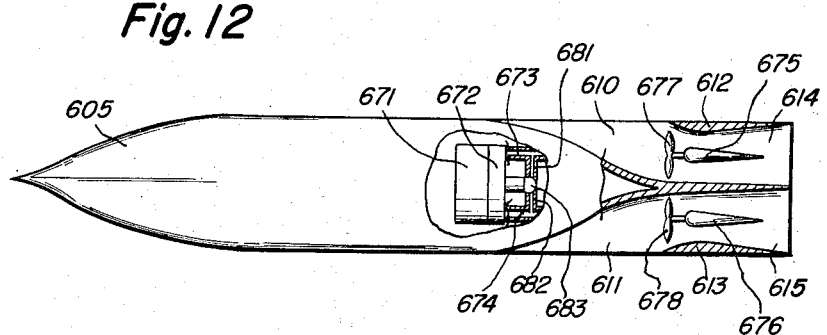
FIG. 12 is a plan view of still another form of vehicle embodying the hydraulic control and driving means of the invention.

The vehicle illustrated in FIG. 12 includes a body 603 carrying a power plant 671 driving a fluid flow producing means 672 having two outputs which are separated but which provide constant or equal proportional rates of flow of the working fluid. The two outputs are connected, by respective supply lines 673 and 674, to respective positive displacement rotary fluid motors 675 and 676 driving respective propellers 677 and 678, with the fluid being returned through suitable return lines either directly or indirectly to means 672. The constant proportionate or equal flow rates of the two separate fluid flows assure substantially equal angular velocity of propellers 677 and 678, which are arranged in respective flow passages 612 and 613 having respective inlets 610 and 611 and respective outlets 614 and 615. The two thrusts, which are symmetrically located on opposite sides of the longitudinal center line or axis of body 605, provides stability of movement of the body.

A line 681 is connected to supply line 673, and a line 682 is connected to supply line 674. Through a control means 683, an additional fluid flow may be supplied selectively to either one of the supply lines 673 and 674, thus increasing the angular velocity of the associated motor and its propeller. In this manner, turning or inclining movement of the vehicle can be controlled. While two driving means are shown, it will be appreciated that four driving means could be used disposed at equal angular distances about the longitudinal center line of the body and preferably at 90 degree intervals.

Figure 13:
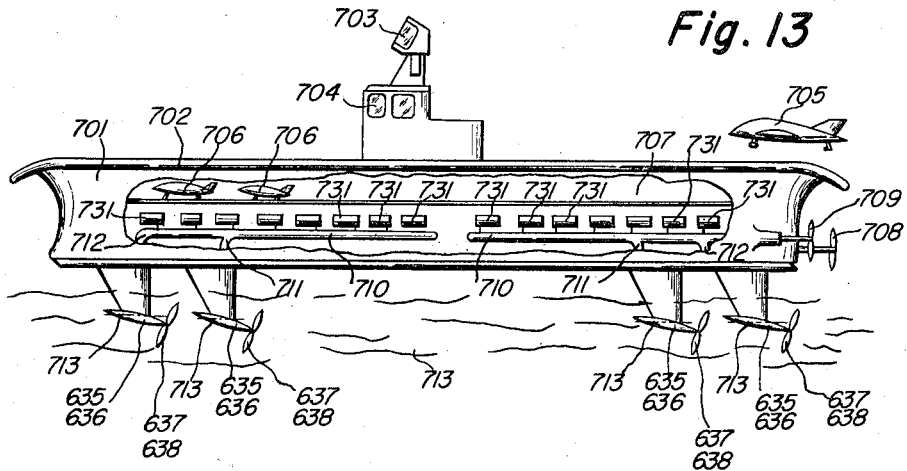
FIG. 13 is a side elevation view, partly broken away, of a large waterborne vessel embodying the hydraulic control and driving means of the invention.

The very large waterborne vessel shown in FIG. 13 is a hydrofoil vessel including a body 71 which may be utilized for passengers or cargo, or which may be the body of an aircraft carrier, and a control tower 704 is mounted on the upper deck and has airspace control means 704 mounted thereon. The upper deck may be designed, for example, for the landing or take-off of aircraft, and aircraft or other cargo may be stored in the spaces 706 and 707 below the upper deck.

The vehicle is provided with a plurality of hydrofoils or wings 713 each having mounted thereon a pair of positive displacement rotary fluid motors 635 and 636 driving respective propellers 637 and 638, the motors of each pair being disposed symmetrically on opposite sides of the longitudinal center line of the vehicle. In order to drive the propellers at sufficiently high angular velocities to move the vessel through the water at a rate sufficiently high that it will rise on hydrofoil 713, a plurality of power plants and associated fluid flow producing means driven thereby are provided, as indicated at 731, and each fluid flow producing means has a pair of separate outputs providing proportionate or equal rates of flow of working fluid. The fluid flow producing means are arranged in two groups, each including a pair of common supply lines 710 each connected to a respective different output of the fluid flow producing means of the respective group. There are thus four common supply lines 710, two connected to the rearward common supply lines 710, two connected to the forward motors 635, 636, and two connected to the forward motor 635 and 636. The forward common supply lines 710 branch into supply lines 711 and 712, as do also the rearward common supply lines 710. Consequently, substantially equal thrusts are provided by all of the propellers 637, 638, which assures stability of movement and attitude of the vehicle by assuring equilibrium between the thrust forces and the movement resisting forces. During such time as the vessel may not be operated at high speed, or at a speed sufficiently high to rise on the hydrofoils, one or more of the fluid flows can be directed into fluid flow motors driving conventional propellers 708 and 709.

Figure 14A:
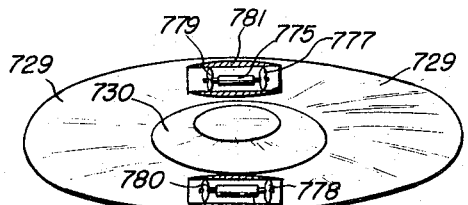
FIG. 14a is a perspective view of a saucer embodying the hydraulic control and driving means of the invention.
Figure 14B:
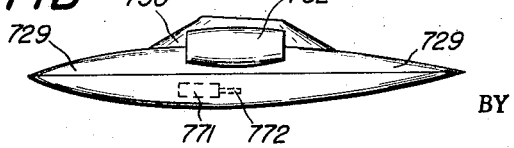

The vehicle shown in FIGS. 14a and 14b has a body 729, in the form of a disk, and including a cabin 730 and a power plant 771 driving a fluid flow producing means 772 having two separated working fluid outputs providing equal and proportionate rates of flow of working fluid driving respective positive displacement rotary fluid motors 775 and 776. Motors 775 and 776 drive respective fluid flow creating means 777, 779 and 778, 780, with the respective flow creating means and associated driving motors being arranged in relatively elongated ducts 781 and 782. The outputs of means 772 are connected to respective motors 775 and 776, whereby equal thrusts are produced on both sides of the center line or diameter of body 729. Suitable control means may be provided for varying the rate of flow of working fluid to the motors to effect turning movements and the like, all as previously described.

The vehicle shown in FIGS. 14a and 14b may be a land vehicle, which can slide on land, ice, snow, or mud, or it may be provided with wheels. Additionally, it can operate on the surface of water or can fly through the air, with the entire body 729 then acting as a wing and turning of the vehicle being effected about the center or axis of the disk.

Figure 15A:
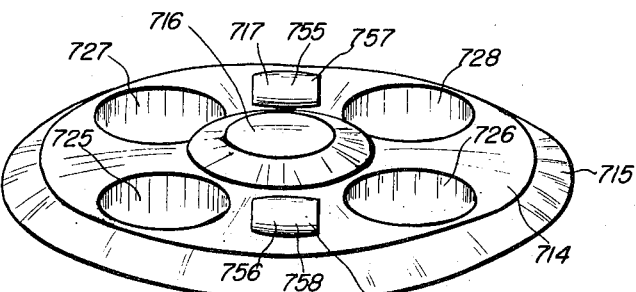
FIG. 15a is a perspective view of an air cushion vehicle embodying the control and driving means of the invention.
Figure 15B:
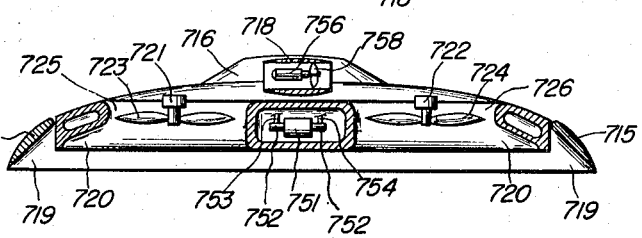

FIGS. 15a and 15b illustrate an air cushion type vehicle which is airborne by fluid streams created by propellers or the like rotating about vertical axes and arranged in respective ducts. The vehicle includes a body 714 having a cabin 716 and formed with a plurality of substantial parallel ducts or the like 725–728 extending therethrough. A fluid producing means 752 driven by a suitable power plant is mounted on the body and supplies working fluid to positive displacement rotary fluid motors 721 and 722 each positioned in a respective duct and driving a respective propeller 723 and 724 rotatable about a vertical axis. While the ducts are shown of equal size, they could be made of proportionate size.

Fluid flow producing means 751 has at least two outputs which are completely separate and provide flow of working fluid at equal or proportionate flow rates.

Each output is supplied to a respective pair of motors, and the motors of each pair may be connected in series with each other so that one fluid flow would be supplied to the motor in duct 75 and from there to the motor in duct 726, with the other fluid flow being supplied to the motor in duct 728 and to the motor in duct 727. This arrangement is illustrative only. Alternatively, four fluid outputs could be provided, of equal and proportional working fluid flow velocity but completely separate from each other, and each fluid output could be supplied to a respective motor in an associated duct.

The vehicle, as so constructed, can act in a stable manner as an air cushion vehicle in ascending or descending in air or in water. For this purpose, an air cushion housing 715 embraces the body of the vehicle to maintain a relatively higher air or water pressure beneath the vehicle, and air cushion means 715 can be made sufficiently large to provide a very large lift to the vehicle. By pivoting housing means 715 about an axis, the vehicle can be converted from horizontal movement to vertical movement, or to a stabilized rest position above a surface.

The outputs of the fluid flow producing means driven by motor 751 are indicated at 753 and 754, and are utilized to drive fluid motor 755 and 756 driving respective propellers 757 and 758 enclosed in respective ducts 717 and 718. When the two flows are equal, or have equal flow velocities, the vehicle will move in a straight line in a selected direction and, by varying the relative rates of flow, the vehicle can be made to turn. Such variation may be effected in any of the manners previously described with respect to other embodiments of the invention. Similarly, a control can be provided whereby the flow rates through the motors mounted in ducts 725–728 may be relatively varied, in turn resulting in control of the direction and attitude of the vehicle.

FIGS. 16A and 16B illustrate a very safe VTOL aircraft having four wing means each having a rotary propelling means associated therewith. The wing means can be the usual straight wings or they can be ring wings or ducts. As illustrated, wing means 804 are designed as straight wings while wing means 806, 807, 808 and 809 are formed as ducts or ring wings which can be pivoted or swung between vertical and horizontal attitudes. Wing means 804, together with wing means 806 and 807, can be turned around bearing means 805 between the horizontal and vertical orientations, and wing means 808 and 809 can swing around bearing means 805, carried by vehicle extensions 810 connected to body 801, between the vertical and horizontal orientations. Struts 833 and 849 of one wing means 804, and struts 834 and 849 of the other wing means 804, support positive displacement rotary fluid motors 835 and 836, respectively, each driving a respective propeller 837, 838. Also, strut means 843 and 849 support a positive displacement rotary fluid motor 845 and strut means 844 and 849 support a positive displacement rotary fluid motor 846, motors 845 and 846 driving respective propellers 847 and 848.

The several driving motors are interconnected with each other so that all four motors produce the same thrust at the same angular velocity, with the four angular velocities being equal or proportionate relative to each other. If the axes of the rotary members are positioned vertically, as shown in FIG. 16A, the vehicle can travel vertically with its stability being maintained due to the symmetrical location of the four driving means producing equal moments about the roll axis and the pitch axis of the vehicle. This creates four lift centers 891 and 892, resulting in a lift center 894 located above the center of gravity 893 of the vehicle, which provides a stable attitude and stable vertical lift of the vehicle as the lift point 894 operates in exact opposition to the center of gravity which is creating a downwardly directed force.

For horizontal movement, the driving means are arranged as shown in FIG. 16B. In order to provide a conveniently small and narrow vehicle which will always be stable during either horizontal flight or vertical flight, and in which the pilot and passengers have an unobstructed view, bearing members 805 are arranged so that wing means 804 can be swung around their axes. For this purpose, the bearing means 805 are connected to body 881 which has a passenger or freight cabin or compartment 813 and a central portion of wing means 804 is stably fixed to body 881. Conveniently, the center portion can be fixed and immovably arranged above cabin 813.

The bearing means 805 are positioned forwardly of cabin 813, each extending to one side of the aircraft and mounting a respective wing means 804. Ducts 806 and 807 are positioned beneath wing means 804 but, when wing means 804 are pivoted to a substantially vertical attitude, the axes of drive means 835 and 836 are forwardly of wing means 804. For this reason, it is preferred that duct means 806 and 807 do not swing around their center points but rather about their upper edges, as viewed in FIG. 16B. On the contrary, wing means 808 and 809 may be swung around their center lines on bearing means 811 so that, at all times, the axes of duct means 808 and 809 are at the same distance from the gravity line.

The axes of bearing members 805 are so positioned so that duct means 806 and 807 do not obstruct the pilot's view even when these duct means are in the horizontal position. The ducts are located sufficiently far from the center line of the vehicle and sufficiently far forwardly and rearwardly from lift line 894 that stability is assured. Extensions 810 assure propellers 847 and 848 being so high above the body of the vehicle that their fluid streams do not interfere with the fluid streams of propellers 837 and 838. The vehicle may have suitable support means, such as wheels or runners 812, so that it may operate on land in a substantially horizontal position. While the driving means may be interconnected mechanically to insure the respective rotary velocities being proportionate or equal, it is preferred that they be interconnected hydraulically. For this purpose, a plurality of power plants 801 driving flow producing means 802 is provided in the vehicle and preferably in a space 814 adjacent the bottom of the body so that the weight of the fluid flow producing means and their power plants creates a concentrated gravity center 893. It will be appreciated that, the lower this gravity center is, the more stable the vehicle will be.

Each fluid flow producing means 802 delivers four separated outputs having equal rates of flow of the working fluid, and each output is connected to a respective fluid motor so that the motors receive proportionate or equal rates of flow of working fluid for proportionate or equal rotary angular velocities of the motors and of the propellers driven thereby. This assures stable operation and movement of the vehicle. It is also possible to cross-connect the motors, in pairs in series, and, in such cases, each fluid flow producing means need have only two separated fluid outputs.

Drive means may be provided for adjusting the fluid flow creating means or the air flow creating means about their axes, and can be hydraulic actuators connected between a supply passage and return passage leading to a fluid motor. It is preferable to provide four of these actuators, one associated with each of the driving means, and to supply four separate flows of working fluid thereto, but of equal or proportionate flow velocity.

The fluidborne vehicle illustrated in FIG. 17 includes a body 850 on which there are fluid motors 855 and 856 spaced symmetrically on opposite sides of the longitudinal center line of the body and driving respective propellers 857 and 858. A fluid flow producing means 852 is driven by a power plant 851, and a supply line 853 connects its output to the inlet of motor 855, with the outlet from motor 855 being connected by an intermediate line to the inlet of the fluid motor 856 whose outlet is connected to a return line 869. Both motors have the same fluid flow supplied thereto, so that they operate at equal angular velocities to drive the respective propellers at equal angular velocities. For forward movement of the vehicle, an additional fluid flow producing means 862, driven by a power plant 861, may be provided, or an additional output may be provided on fluid flow producing means 852. This additional output, or the output of fluid flow producing means 862, is delivered through a line 863 into intermediate line 864.

With the supply of such an additional fluid flow, motor 856 will operate faster than motor 855. When the flow through line 863 is zero, the two motors operate at equal angular velocities. However, in accordance with the rate of flow of fluid into line 863, the two motors will operate at different speeds, resulting in one propeller producing a greater lift than the other, with resultant inclination of the vehicle for motion in the direction of the slower speed motor. If fluid flow producing means 862 is of positive displacement, variable delivery hydraulic pump, than the quantity of fluid, or the rate of supply of fluid to enter fluid line 863, can be accurately controlled to provide very small inclinations of the vehicle.

FIG. 18 graphically illustrates the pressures and velocities relative to a vessel 901 moving through water in the direction of the arrow. At the bow of vessel 901, there is an increase in pressure as indicated at A which is accompanied by a decrease in the velocity of the water in advance of the bow relative to the ship. The pressure and relative velocity between the ship and the water is illustrated schematically below the ship or vessel 901. Since the hull has a certain thickness and, due to Newton's and Bernouilli's laws of motion of fluid and the law of continuity, along the hull the velocity of water relative to the ship increases, and this is accompanied by a decrease in static pressure and in lowering of the water surface. Toward the stern of the ship, the hull narrows, resulting in a decrease of the relative velocity which is accompanied by an increase in the static pressure of the water and the raising of the water surface.

Behind vessel 901, the relative velocity between the vessel and the water decreases to a low value as indicated at D, while the static pressure P increases as indicated at C. It will thus be clear that pressure area A and velocity B, in advance of hull 901, tend to resist movement of the hull through the water, while pressure area C and the velocity D, behind the hull, tend to assist the forward motion of the hull.

The hitherto common practice of positioning a ship propeller at the stern of the ship in the areas C and D decreases or even nullifies the hull actions of the areas C and D. However, if a pair of propulsion members or propellers are disposed laterally of the bow of the ship, this could result in diminishing the movement resisting pressure at area A. The same positive increase in drive and decrease in resistance are possible with propelling means arranged laterally of the head of the aircraft rocket or laterally of the front end of a land vehicle.

FIG. 19 illustrates a vehicle exemplifying the principles graphically illustrated and described with respect to FIG. 18. During movement of this vehicle, a pair of headwaves, 907, 908, at an inclination 906 relative to the direction of movement 909 of body 901, is created, and these headwaves are under a higher static pressure and raise the surface of the water in their areas. In accordance with the invention, a pair of fluid flow creating means 937 and 938, providing two or more fluid streams 910, are positioned symmetrically on opposite sides of the bow of body 901, so that headwaves 907 and 908 can enter into the suction or intake areas 905 of these fluid flow creating means. The intake areas 905 may comprise guide vanes or the like, in order to change the direction of movement of the headwaves contrary to the motion 909 of body 901. This results in an increase in the thrust for driving the vehicle forwardly and thus in an increase in the velocity of the vehicle. The power supply unit for the fluid flow creating means 937 and 938 may be of a conventional type or may be the hydraulic control and driving means of the present invention.

By way of example, a power plant 931 may drive the fluid flow producing means 952 having plural separate fluid outputs 933 and 934 providing proportionate or equal rates of flow of working hydraulic fluid. One output is delivered to fluid motor 935 and the other to fluid motor 936, each operating a respective propulsion member 937, 938 so that the fluid streams 910 have proportionate or equal rates of flow. The return fluid flow occurs directly or indirectly through fluid flow lines 949.

The vehicle illustrated in FIG. 20 is similar to that illustrated in FIG. 19, but is constructed for longitudinal adjustment of the fluid stream creating means 902 and 903 in accordance with different speeds of the vehicle, and relative to headwaves 907 and 908. With an increase in the velocity of the vehicle relative to the supporting fluid, inclination 906 of the headwaves decreases, while it increases with the decrease in the speed of the vehicle. Fluid stream creating means 902 and 903 are arranged in support struts 911 positioned in bearing beds 912 and 913 for adjustment therealong by means 915 connected to drive means 916. The fluid stream creating means 902 and 903 may be adjusted longitudinally of vehicle 901 in a favorable manner so that the fluid streams 910 are at all times at the most effective locations.

Figure 21:
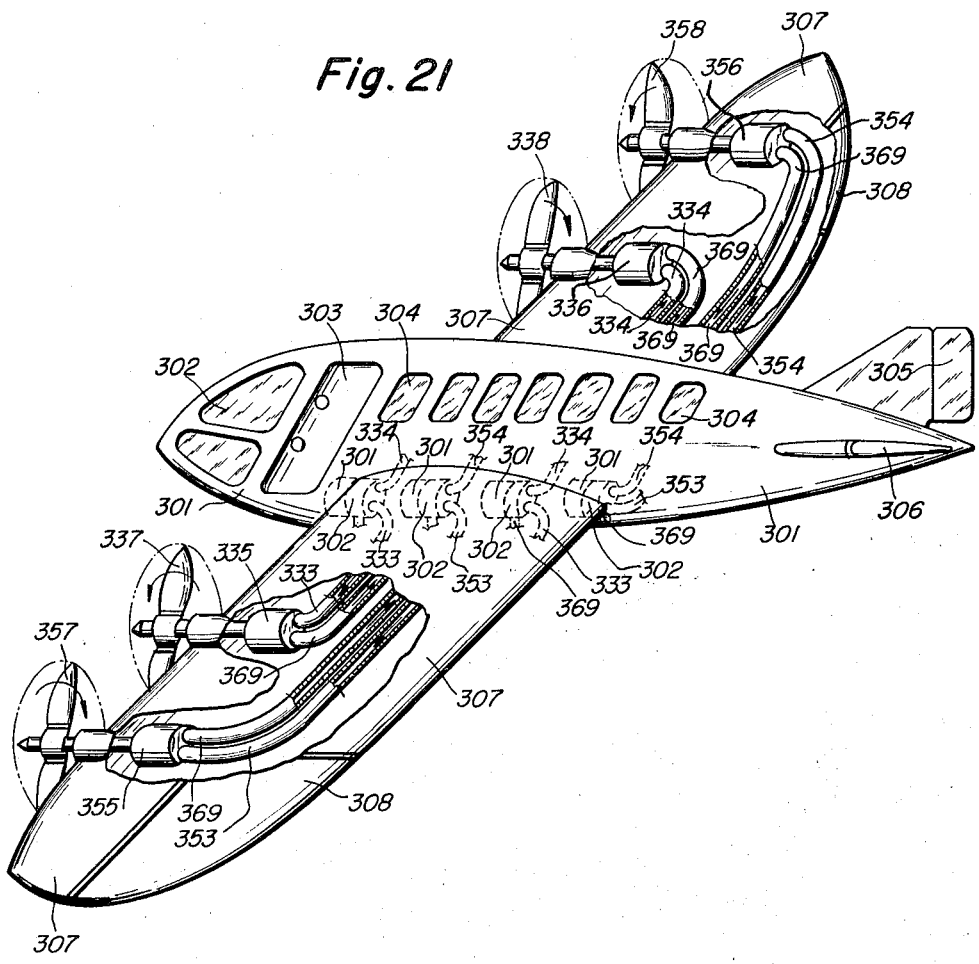
FIG. 21 is a perspective view, partly broken away in section, of another form of aircraft embodying the hydraulic control and driving means of the invention.

The aircraft shown in FIG. 21 is somewhat similar to that shown in FIG. 1, but differs from the latter in that it has two pairs of propellers rather than only two propellers, with the propellers of each pair being located symmetrically on opposite sides of the longitudinal center line of the vehicle. An important feature of this embodiment of the invention is that the pair of inboard propellers 337, 338 can have blades at one inclination, or angle of attack, and the pair of outboard propellers 357, 358 may have blades at a different inclination of angle of attack. Thereby, one pair of propellers can have blades at an inclination or line of attack which is very effective at low speeds, with the other pair of propellers having blades at an inclination or line of attack which is very effective at high speeds. Thus, it is possible to provide an aircraft which has one pair of propellers particularly effective during take-off and a second pair of propellers particularly effective during high speed flight, with the result that the two pairs of propellers augment each other economically. An additional advantage is that the propellers can have fixed blades, thus obviating the necessity for blade adjusting means and decreasing the cost of the aircraft.

The aircraft includes a body or fuselage 300 in which there are mounted plural fluid flow producing means 302 driven by respective power plants 301, four fluid flow producing means and four power plants being illustrated. Each fluid flow producing means has two separate outputs, providing flows of working fluid at equal or proportionate velocities or rates of flow. In the illustrated embodiment, first outputs of two fluid flow producing means are connected to a common working fluid supply line 333, and the second outputs of these two fluid flow producing means are connected to a common working fluid supply line 334. The first outputs of the other two fluid flow producing means are connected to a common working fluid supply line 353, with their second outputs being connected to a common working fluid supply line 354. The flow adjustment means for the several fluid flow producing means are combined into a single control.

The heavy components, such as the power plants and the fluid flow producing means, are located as low as possible in body 301, while a freight or passenger cabin 304, having an entrance 303, may be located thereabove. Control rudders 305 and 306 may be provided on fuselage 300 in the usual manner, and the fuselage may be provided with wings 307 and associated control surfaces 308.

The separate flows of fluid of equal rate of flow are provided since there are two pairs of propellers. Thus, common supply line 333 delivers working fluid to positive displacement rotary fluid motor 335, from which the working fluid is returned through a return line 369. Common supply line 334 delivers working fluid to positive displacement rotary fluid motor 336, and returns through line 369. Common supply line 354 supplies working fluid to positive displacement rotary fluid motor 356, and is returned through return line 369, and common supply line 353 supplies working fluid through positive displacement rotary fluid motor 355 and is returned through line 369. The motors 335, 336, 355 and 356 drive respective propellers 337, 338, 357 and 358. With the described connection arrangement of the supply lines, it will be clear that motors 335 and 336 are driven at constant proportionate or equal velocities, together with their propellers 337 and 338, and the same holds true for motors 355 and 356. Due to the relatively compact size of the positive displacement rotary fluid motors, it is possible to locate them in relatively small spaces in wings 307.

An advantage of the arrangement shown in FIG. 21 is that it is very simple to rotate the propellers of each pair in opposite angular directions, because it is relatively easy to reverse the direction of rotation of a rotary fluid motor. Thus, for example, inboard propellers 337 and 338 can rotate in opposite angular directions relative to each other, and outboard propellers 357 and 358 can be rotated in opposite angular directions relative to each other. A suitable pilot's compartment 309 is provided, and it should be noted that it is no longer necessary for the pilot to adjust the speeds of the several propellers, as this is effected automatically by the supply of working fluid thereto at equal flow rates.

It will be appreciated that it is possible to connect motors in series with each other. By way of example, working fluid can be supplied to motor 336, as an upstream motor, and then supplied through an intermediate line to motor 355, as a downstream motor, while working fluid can be supplied to motor 335, as an upstream motor, and then through an intermediate line to motor 356, as a downstream motor. Alternative series connections also can be used. The rudders and other control surfaces can be operated hydraulically, as can also accessory components, such as the landing gear and other elements.

While specific embodiments of the invention have been shown and described in detail to illustrate the application of the principles of the invention, it will be understood that the invention may be embodied otherwise without departing from such principles.

I claim:

1. A fluid stream driven vehicle comprising, in combination, a body having a longitudinal axis of substantial symmetry; at least one pair of hydraulic fluid operated motors on said body, with the motors of each pair being arranged symmetrically on opposite sides of said axis; respective fluid stream creating driving means driven by each motor; at least one hydraulic fluid flow producing means producing at least one pair of separated and independent output flows of hydraulic fluid under pressure, with the flow rates of the two output flows being constantly equal to each other; separate and independent supply lines each connected directly to said flow producing means and respectively delivering one flow directly to only at least one motor on one side of the vehicle axis and the other flow directly only to at least one motor on the opposite side of the vehicle axis, to provide separated fluid flows, at equal flow rates, to the motors on the opposite sides of the axis; the number of motors supplied by each flow being equal to that supplied by the other flow; and respective return flow lines connecting each motor directly to said fluid flow producing means; whereby the hydraulic fluid flows through all the motors on both sides of the axis at the same flow rate and independently of the fluid pressure so that the fluid stream creating means on opposite sides of said axis are driven at equal velocities to produce equal thrusts on both sides of said axis for stabilizing the attitude of said vehicle.

2. A vehicle, as claimed in claim 1, including additional separately actuated hydraulic fluid flow means selectively operable to vary the relative rates of flow of hydraulic fluid to the motors on respective sides of said axis to effect a turning movement of said vehicle.

3. A vehicle, as claimed in claim 1, including at least one bypass line connecting a supply line to the associated return line and having a passage portion operable to restrict the rate of flow therethrough to a rate which is a minor fraction of the rate of said pair of output flows; and control means operatively associated with each bypass line and selectively operable to open or to close the associated bypass line.

4. A vehicle, as claimed in claim 2, including passage means connecting said additional hydraulic fluid flow means to at least one motor on one side of said axis; said passage means having a small cross-sectional area restricting the rate of flow therethrough to a minor fraction of the rate of flows through said independent supply lines; and a control device interposed in said passage means and selectively operable either to block flow therethrough or to direct a preselected portion of the flow of said additional hydraulic flow means to said at least one motor on one side of said axis.

5. A vehicle, as claimed in claim 3, including a common manually operable control device connected to said control means for conjoint operation of the latter.

6. A vehicle, as claimed in claim 1, including flow adjusting means connected to said fluid flow producing means and operable to adjust the flow through the two outputs in a proportionate manner to vary the speed of said vehicle.

7. A vehicle, as claimed in claim 1, in which said vehicle is an aircraft having a fuselage constituting said body, and a pair of wings; one motor being mounted on each wing and said fluid flow producing means being mounted in said fuselage; said fluid stream creating means comprising at least one traction propeller driven by said motors.

8. A vehicle, as claimed in claim 1, in which said vehicle is an aircraft having a fuselage, constituting said body, and a pair of wings extending from said fuselage; each of said wings having a duct extending perpendicularly therethrough; each motor being mounted to extend coaxially of a respective duct; said fluid flow creating means comprising respective propellers rotatable in said ducts, whereby to provide for sustaining of said aircraft by the thrusts of said propellers; said fluid flow producing means being mounted in said fuselage; a further propeller mounted at the front end of said fuselage; power means driving said fluid flow producing means; and means connecting said power means to said further propeller to rotate the latter.

9. A vehicle, as claimed in claim 1, in which said vehicle is an aircraft having a fuselage constituting said body; said fluid flow producing means being mounted within said body; two pairs of wings extending from opposite sides of said body; there being four motors, one mounted on each of said wings, and said fluid flow creating means comprising respective propellers driven by said motors; said hydraulic fluid flow producing means having four separate outputs each connected to a respective motor.

10. A vehicle, as claimed in claim 1, in which said body is a flying disk with said motors arranged on opposite side of diameter thereof; said fluid stream creating means comprising propellers; each motor and its associated propellers being mounted in a respective duct extending parallel to said diameter.

11. A vehicle, as claimed in claim 1, in which said vehicle is an air cushion vehicle including a substantially circular body having four equiangular spaced ducts extending vertically therethrough; there being four of said motors each coaxial with a respective duct and each driving a respective propeller constituting one of said fluid stream creating means; a further pair of motors mounted on said body in spaced parallel relation and symmetrically on opposite sides of a diameter thereof and driving a respective propeller for horizontal movement of said vehicle; each of said further pair of motors being mounted, together with its propeller, in a respective duct extending substantially parallel to said diameter; and an air reflecting rim embracing said body and providing an air cushion area therebeneath during operation of the propellers located in said first-mentioned ducts.

12. A vehicle, as claimed in claim 1, in which said vehicle is an aircraft having a fuselage constituting said body; two pairs of wings, each including a wing extending from a respective opposite side of said body, one of said pairs of wings being arranged adjacent the forward end of said body and the other pair of said wings being arranged adjacent the rear end of said body and substantially above the level of said one pair of wings; each pair of wings being mounted on said body for movement between a substantially horizontal attitude and a substantially vertical attitude; each wing including a duct extending transversely thereof; there being four of said motors, each mounted coaxially of a respective duct and each driving a respective propeller constituting one of said fluid stream creating means and disposed within the respective duct; and means operable to move said wings between a substantially horizontal position, in which the axes of said ducts are substantially horizontal, for horizontal travel of said vehicle, and a vertical position, in which said axes of said ducts are substantially vertical, for vertical movement of said vehicle; the level of the wings of the rearward pair being sufficiently higher than the level of the wings of the forward pair that the respective air streams created thereby do not interfere with each other.

* * * * *